eral point in the inlet end wall of an intermediate reactor having an inlet end wall, a generally cylindrical side wall and an open outlet end, the reactant hydrocarbon mixture and reactant air being introduced in a direction parallel to the longitudinal axis of said intermediate reactor, the reactant hydrocarbon mixture being greatly in stoichiometric excess of the reactant air, burning the combustible mixture formed by the reactant air and a portion of the reactant hydrocarbon mixture to maintain the temperature in the intermediate reactor sufficiently high to crack the reactant hydrocarbon mixture to increase the content of unsaturated hydrocarbons without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing a mixture of gaseous fuel and at least sufficient oxygen-containing gas for substantially complete combustion of said fuel into the reactor chamber near the inlet end wall through a burner port, burning the fuel-gas and air to maintain the temperature in the reactor chamber at the carbon black forming temperature, said burner port being so positioned in the side wall of the reactor chamber as to direct the flow of fuel and oxygen-containing gas in a direction tangent to the inner surface of the chamber side wall and essentially perpendicular to the longitudinal axis of said cylindrical reactor chamber, the mixture of fuel and oxygen-containing gas being introduced through said burner port at sufficiently high velocity and in sufficient quantity to maintain the flame and combustion products by centrifugal force adjacent the whole inner surface of the chamber side wall thus forming a separating layer of said flame and combustion products between the side wall and the intermediate reactor effluent in the reactor chamber, cooling the effluents of the reactor chamber to below the carbon cracking temperature and separating the carbon black from the products of combustion.

10. The continuous process of producing carbon black which comprises atomizing a gas-oil into a stream of reactant hydrocarbon in the gaseous state whereby a reactant hydrocarbon mixture is formed, introducing the reactant hydrocarbon mixture along with reactant air at a non-peripheral point in the inlet end wall of an intermediate reactor having an inlet end wall, a generally cylindrical side wall and an open outlet end, the reactant hydrocarbon mixture and reactant air being introduced in a direction parallel to the longitudinal axis of said intermediate reactor, the reactant hydrocarbon mixture being greatly in stoichiometric excess of the reactant air, burning the combustible mixture formed by the reactant air and a portion of the reactant hydrocarbon mixture to maintain the temperature in the intermediate reactor sufficiently high to crack the reactant hydrocarbon mixture to increase the content of unsaturated hydrocarbons without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing oxygen-containing gas into the reactor chamber near the inlet end wall through a burner port, said burner port being so positioned as to direct the flow of said oxygen-containing gas in a direction tangent to the inner surface of the side wall of the reactor and with the predominating component of motion perpendicular to the longitudinal axis of said cylindrical chamber, said oxygen-containing gas and a portion of said reactant gaseous hydrocarbon mixing to form a combustible mixture, burning the mixture to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor chamber side wall, thus forming a separating layer of said flame and combustion products between the side wall of the reactor and the gaseous hydrocarbon in the reactor chamber, cooling the effluents of the reactor chamber to below the carbon black forming temperature and separating the carbon black from the products of combustion.

11. The continuous process of producing carbon black comprising introducing a stream of preheated reactant hydrocarbon in the gaseous state at a non-peripheral point in the inlet end wall of an intermediate reactor having an inlet end wall and a generally cylindrical side wall and an open outlet end, the reactant hydrocarbon being introduced in a direction parallel to the longitudinal axis of said intermediate reactor, further introducing directly into the intermediate reactor an atomized spray of gas-oil, maintaining the temperature in the intermediate reactor sufficiently high to crack the reactant hydrocarbon and atomized gas oil to increase the content of unsaturated hydrocarbon without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing a mixture of gaseous fuel and at least sufficient oxygen-containing gas for substantially complete combustion of said fuel into the reactor chamber near the inlet end wall through a burner port, burning the fuel-gas and air to maintain the temperature in the reactor chamber at the carbon black forming temperature, said burner port being so positioned in the side wall of the reactor chamber as to direct the flow of fuel and oxygen-containing gas in a direction tangent to the inner surface of the chamber side wall and essentially perpendicular to the longitudinal axis of said cylindrical reactor chamber, the mixture of fuel and oxygen-containing gas being introduced through said burner port at sufficiently high velocity and in sufficient quantity to maintain the flame and combustion products by centrifugal force adjacent the whole inner surface of the chamber side wall thus forming a separating layer of said flame and combustion products between the side wall and the intermediate reactor effluent in the re- Patented May 15, 1945

2,375,798

UNITED STATES PATENT OFFICE 2,375,798

CARBON BLACK PROCESS

Joseph C. Krejci, Kaw, Okla., assignor to Phillips Petroleum Company, a corporation of Delaware Application June 1, 1942, Serial No. 445,338

3 Claims. (Cl. 23—209.8)

This invention relates to a process of producing carbon black, and more particularly to an improved method of producing carbon black by incomplete combustion of carbonaceous gases and vapors, or by decomposition thereof by contact with hot gases. This application is a continuation-in-part of my copending applications, Serial No. 424,084, filed December 22, 1941, and Serial No. 436,524, filed March 27, 1942.

At the present time most of the carbon blacks of commerce are produced by a very few processes and from a very few materials. These blacks may be grouped into classes depending upon the use to which the blacks will be put, and those going into rubber compounds comprise a large proportion of the annual output. Carbon black utilized in the rubber industry is classed according to the types of rubber compound and vulcanized rubber which the blacks will produce. A soft black as compared to a hard black is one which when mixed in a conventional rubber compound and the mixture then vulcanized yields a product which is softer, more resilient, more rubbery and yet tough, whereas a hard carbon black in the same compound imparts stiffer, tougher characteristics, with lower resilience. These two types of carbon black may be considered essentially as "limits" and many of the carbon blacks produced will possess hardness properties intermediate these above limits.

The commercial "channel" process produces a hard type carbon black mainly from natural gas, the black being especially good for compounding automotive tire tread stocks which withstand abrasion and possess good physical test properties. However, the yield of carbon by this process is only from 2.4 to 3.5 per cent of the carbon content of the gas from which it is made, as disclosed in my copending application, Serial No. 424,084. Higher yields can be produced, but the black is not suitable for tire tread stock purposes.

I have found in my operation of my novel carbon black furnace, disclosed in my above referred to applications, that the yield and quality of the black are not especially dependent upon a high carbon content of the fuel to the tangential burners and that a lean or low carbon content gas serves well in this capacity. I have also found that variations in the carbon content of the reactant gas, described below, directly affects the yield and quality of the black produced.

An object of this invention is to provide an apparatus and process for increasing the yield of carbon black made from gases relatively lean in carbon content, the black being of excellent quality as regards use in tire tread stocks.

Another object of this invention is to provide an apparatus and process for making carbon black of increased yield and of quality equal or superior to that produced according to my copending applications when using a carbonaceous gas of relatively low carbon content.

Still another object of my invention is to increase the yield of the carbon black and to improve the quality of the black which can be manufactured from a specific, relatively lean hydrocarbon gas preheated to a specific temperature.

Still other objects and advantages will be apparent to those skilled in the art from a study of the following description, drawing and appended claims.

In my copending applications, the carbon containing gas was divided into two portions of similar composition, one portion or stream being preheated and passed into the carbon producing furnace as the carbon producing, reactant gas, the other portion or stream of the gas being mixed with air for combustion and passed into the interior of the cylindrical reaction chamber in such a manner as to form a helically traveling layer of flame and products of combustion on the inside surface of said reaction chamber to form a partition or layer or blanket of flame and combustion products to prevent deposition of carbon on the chamber walls. The fuel gas and air mixture was passed into the reaction chamber from one or more burner ports in a direction essentially tangent to the interior side wall and approximately perpendicular or normal to the longitudinal axis of the chamber. The long axis of the burner opening in the chamber side wall was best pointed a few degrees off perpendicular in the downstream direction so that the layer or blanket of flame on the side walls would tend to travel in a helical path beginning at the burner port at the inlet end of said chamber and passing toward the outlet end of the chamber, the velocity of the gases at the burner port being so great that said gases adhere to the side walls due to their centrifugal force, while following the helical path from the inlet end to the outlet end of said reaction chamber.

I have found that it is not necessary and in water spray 14, and from the cooler 21 containing said water spray, the carbon black and gases pass through pipe 22 to a carbon black removal system 33. This latter may be a conventional baghouse or suitable carbon black collecting system. For sake of simplicity, the cooling and collecting equipment is shown diagrammatically.

The detailed methods of producing carbon black with both the above described embodiments of my carbon black reaction chambers are disclosed and described in detail in my above referred to patent applications, namely, Serial Nos. 424,084 and 436,524.

In these aforementioned applications, applicant's method of operation consisted of splitting the stream of carbon containing gas into two portions of equal composition, using one portion as reactant gas, and the other portion as tangential burner fuel. Applicant has found by experiment that when a natural gas is separated into two fractions, one containing the higher and heavier hydrocarbons, such as propane, butane, pentane, etc., along with some methane and ethane, and the other containing some ethane but predominantly methane, and the richer fraction used as reactant gas and the leaner fraction as the tangential fuel, that the overall yield of carbon black is greater than when the original natural gas is used as both reactant gas and tangential fuel. Thus, this application has to do with this method of increasing carbon black yields from natural gases.

The method of separating the hydrocarbon gas into a rich reactant gas and a lean fuel gas can be selected from several known in the art. A simple absorption system for carrying out this separation is included in the drawing. However, it is to be understood that this invention is not limited as to the method of carrying out this separation, except as specified in the claims. Referring to Figure 1 of the drawing, absorber 38 and stripper 37 are conventional towers of the bubble-plate type. The raw hydrocarbon gas enters the absorber through pipe 40 and passes upwardly through the absorber countercurrently to the flow of absorption oil. The absorber should best be operated under high pressures, as for example, 100-200 pounds per square inch, but may well be operated under other pressures, depending upon local conditions. The lean gas leaves the top of the absorber 38 through pipe 41 and all or part of it is carried by pipe 47 to the fuel system and tangential burners 15 of the reaction chamber. Air from pipe 46 mixes with lean gas from pipe 47 and the mixture passes through pipe 48 into the tangential burners 15.

The rich oil passes from the bottom of the absorber through pipe 42 into the top of tower 37. The pressure on the rich oil is released as it enters said tower 37, resulting in the flashing of dissolved hydrocarbons in the upper part of this tower. To assist in the removal of the dissolved hydrocarbons from the rich oil, a small portion of the lean gas issuing from the absorber through lean gas line 41 may be bypassed from the fuel system through gas line 44 and passed upwardly through tower 37 to strip out from the rich oil dissolved hydrocarbons not removed by the said flashing. Stripped or lean oil is pumped through pipe 45 by pump 39 from the bottom of the stripper 37 to the top of the absorber 38. Stripped rich gas plus a small quantity of lean gas which is used to facilitate stripping leaves the top of the stripper through line 43. To some extent, the adjustment of the volume of lean gas used for stripping can be used as a means of controlling the ratio of fuel gas to reactant gas. If it is desired not to dilute the rich gas with a part of the lean gas or other stripping agent, the rich oil can be simply flashed by pressure reduction and/or temperature increase in a flash chamber, or if desired or necessary, as will be apparent to one skilled in the art, it can be stripped further, in the same or in an auxiliary chamber by means of vacuum and/or heat. It should be understood that the relatively dry, lean gas issuing from the outlet of the absorber is the preferred stripping agent since it is a carbon containing material not detrimental to the production of carbon black, but other stripping agents, as for example, steam, may be used. In case steam were used in this capacity, the steam-stripped vapors would need be cooled to condense the steam to water and the water separated.

The rich gas from the top of the stripper 37 passes through pipe 43, or rich gas from another source passes through gas inlet 29, into the preheating furnace 25 in which it is heated in the reactant gas heating coil 27. Likewise, reactant air, if used, enters the furnace through pipe 28 and is heated in coil 26. The preheated gas and air are carried by pipes 23 and 24, respectively, to the reaction chamber.

Opening or openings 20 in the reaction chamber wall are for inspection or insertion of temperature measuring devices, etc.

Chamber 10 is equipped with one or more fuel burners extending through the chamber wall and terminating in an ovel-shaped opening, such that the incoming gaseous fuel enters the reaction chamber tangential to the inside cylindrical surface of the chamber and in a plane essentially normal to the longitudinal axis thereof, or preferably sufficiently off normal to the extent of about 5 degrees in the downstream direction. The use of several tangential burners has been found advantageous in some modifications, and particularly, in reaction chambers of large diameter. The burner nearest the inlet end of the chamber is preferably larger than the others, since it has been found effective to introduce most of the fuel near the said inlet end. In one chamber of 9½ inches inside diameter, applicant employed three tangential burners 1, 6, and 11 inches from the inlet end, the first and third burners were located as shown in Figures 1 and 2; the second burner, shown in Figure 3, was half-way between the first and third burners, and at 180° around the circumference from them. These burners are preferably pointed a few degrees off normal to the longitudinal axis of the reaction chamber in the downstream direction in order to produce the helically traveling layer or blanket of flame and combustion products, as described heretofore. The hydrocarbon absorption-stripping apparatus may be operated in any conventional manner well known to those in the art, the purpose of said apparatus and operations being to concentrate the higher carbon-containing portion of the gas into one fraction for use as reactant gas leaving the denuded or lean gas for use as the tangential fuel.

The operation of both embodiments of the reaction chamber, as represented in Figures 1 and 2, are fully and completely described in my above referred to copending applications, of which this application is a continuation-in-part.

Table I shows the yields of carbon black obtained during the manufacture of carbon black from a lean hydrocarbon gas and from a rich hydrocarbon gas—containing 31 and 35 pounds of carbon per 1000 cubic feet, respectively. In the four runs reported herein, the reaction chamber 10 was 4½ inches in diameter and 22 inches in length. At the inlet end of the chamber was one tangential burner 0.69 inch in diameter. Inlet tube 16 was one inch in diameter and two inches in length. In the runs reported in this table, rich gas was compared to lean gas as reactant gas, and lean gas compared to rich gas as the tangential fuel gas. The reactant gas and the reactant air were heated individually, but to the same temperature in the preheating furnace, as recorded in the second column of the table. The fuel gas and the fuel air, both at room temperature, were mixed in the burner before entering the reaction chamber. In all runs the amount of tangential fuel used was sufficient to keep the inside wall of chamber 10 free of carbon. The fuel was composed of gas and air in the theoretical ratio for complete combustion to carbon dioxide and water, although this exact ratio was not necessary for the successful operation of the process.

TABLE I

*Dependence of yield of carbon black on character of gas*

| Run No. | Preheat furnace, temp. °F. | Reactants, cu. ft./hr. | | | Fuel, cu. ft./hr. | | | Yield, lbs./M cu. ft. |
|---|---|---|---|---|---|---|---|---|
| | | Rich gas | Lean gas | Air | Rich gas | Lean gas | Air | |
| B263 | 1,800 | 200 | 0 | 200 | 100 | 0 | 1,100 | 6.3 |
| B263R | 1,800 | 200 | 0 | 200 | 100 | 0 | 1,100 | 5.0 |
| B274 | 1,800 | 0 | 200 | 200 | 100 | 0 | 1,100 | 3.6 |
| B275 | 1,800 | 200 | 0 | 200 | 0 | 110 | 1,100 | 5.6 |

Comparison of the yield in run B275 with the average of the yields in runs B263 and B263R shows that making the fuel gas leaner in the higher hydrocarbons does not change the yield which can be obtained from the same reactant gas, and comparison of the yields in runs B263 and B263R with that of run B274 shows that enriching the reactant gas with higher hydrocarbons while using the same fuel gas definitely increases the yield.

To determine the effect of variations in the richness of the reactant gas and of the fuel gas, the samples of carbon black produced in the runs of Table I were compounded in rubber, and the resulting products were tested. The following compounding formula was used:

| | Parts by weight |
|---|---|
| Smoke sheet | 100 |
| Carbon black | 50 |
| Zinc oxide | 5 |
| Sulphur | 3 |
| Stearic acid | 3 |
| Phenyl-B-napthylamine | 1 |
| Captax | 0.9 |
| Pine tar | 3 |

The stress-strain results at various vulcanizations are given in Table II. All samples were vulcanized at 260° F. The "500% modulus" refers to the pull in pounds per square inch in a tension test when the test piece of vulcanized rubber has been stretched 500 per cent of the length of the original test piece. The "tensile at break" represents the pull in pounds per square inch at the point of rupture or break of the test piece undergoing the above "500% modulus" test. The "elongation" is the stretch or elongation at break in per cent based on the length of the original test piece. The "acetone extractable" is the loss in per cent by weight of the original carbon black upon extraction with acetone.

TABLE II

*Rubber tests*

| Sample | Vulcanization at 260° F., minutes | Modulus, pounds per sq. inch, 500% | Break, pounds per square in. | Elongation, per cent | Acetone extractable on original carbon black, per cent |
|---|---|---|---|---|---|
| B263 | 30 | 2,970 | 4,240 | 640 | 0.12 |
| B263 | 45 | 3,390 | 4,270 | 59 | |
| B263 | 60 | 3,710 | 4,350 | 570 | |
| B263 | 90 | 4,170 | 4,170 | 500 | |
| B263R | 30 | 2,660 | 4,290 | 660 | 0.00 |
| B263R | 45 | 3,190 | 4,420 | 625 | |
| B263R | 60 | 3,550 | 4,230 | 592 | |
| B263R | 90 | 3,865 | 4,230 | 537 | |
| B274 | 30 | 2,160 | 4,090 | 695 | 0.89 |
| B274 | 45 | 2,600 | 4,130 | 665 | |
| B274 | 60 | 2,785 | 3,865 | 620 | |
| B274 | 90 | 3,130 | 3,990 | 595 | |
| B275 | 30 | 2,560 | 4,200 | 675 | 0.00 |
| B275 | 45 | 3,225 | 4,385 | 625 | |
| B275 | 60 | 3,515 | 4,490 | 610 | |
| B275 | 90 | 3,880 | 4,300 | 545 | |

A study of the data of Table II, taken in conjunction with those of Table I, reveals that substitution of a lean gas for a rich gas in the tangential fuel does not affect the quality of the carbon black produced, for the sample from run B275 was substantially equal in quality to the samples from runs B263, and B263R. However, substitution of a lean reactant gas for a rich one definitely lowers the quality of the product, as is evidenced by the considerably lower modulus and higher acetone extractable content of the sample from run B274 compared to those from runs B263 and B263R. In this discussion high modulus is considered a desirable quality, as is true when the carbon black is used in tire tread stock.

The results in Tables I and II show that the addition of higher hydrocarbons to the reactant gas improves both the yield and the quality of the product, and that the removal of higher hydrocarbons from the fuel gas does not cause any loss in yield or quality. Therefore, separation of the hydrocarbon feed gas into a rich reactant gas and a lean fuel gas in the improved process herein disclosed increases the yield of carbon black and improves the quality of the carbon black.

My improved process can be applied essentially to any carbon-bearing gas which can be separated into a carbon-rich fraction and a carbon-lean fraction. The method of the separation can be selected from several known to the art and, as already stated, the process is not limited to the particular method used herein as an example.

My improved process is not limited to the particular form of the preheater and the reaction chamber shown in the drawing. The use of reactant air is optional. Preheating of the reactant gas and reactant air may be omitted, as it is not necessary for successful operation of the process. The reaction chamber may be of any form in which a layer of flame and products of combustion separating the chamber wall and the stream of gas undergoing decomposition can be maintained. Several possible forms of the reaction chamber were described in my aforementioned copending applications.

In another form of the process, the separation step can be applied to a gas rich in unsaturated hydrocarbons made by cracking a hydrocarbon gas. In this form, the unsaturated hydrocarbons are preferably concentrated in the reactant gas.

It is to be understood that the source of lean gas for the tangential burner fuel and the source of rich gas as the reactant or carbon-producing gas are immaterial, for example, a lean or residue gas from one source and a richer gas from another source may be used, or a natural gas may be separated into a lean fraction and a rich fraction by absorption-stripping methods, or separation may be affected by simple compression and cooling methods, or a combination of both, or a lean gas may be enriched with higher hydrocarbons from any source and yet remain within the scope and intent of my invention. In addition to natural gases which contain for the most part saturated paraffinic hydrocarbons, refinery gases containing unsaturated compounds may be used herein, or refinery gases as rich reactant gas and natural or residue gas as the tangential burner gas may be used. Thus, it it obvious that many variations and combinations of gases may be used according to my invention, the sole condition being the utilization of a lean tangential fuel gas and a richer reactant gas, whereby the yield of high quality carbon black is increased over that obtainable when the mixture of rich and lean gases are used both as reactant gas and tangential fuel gas.

Because my invention may be practiced otherwise than as specifically shown and described herein, and since many modifications and/or variations of it will be apparent and obvious to those skilled in the art without departing from the spirit and scope of my invention, it should not be restricted except as specified in the following claims.

I claim:

1. The process of making carbon black of increased yield from hydrocarbon gas mixtures comprising the steps of separating the hydrocarbon gas mixture into a fraction relatively rich in carbon termed rich reactant gas, and a fraction relatively lean in carbon termed fuel gas; introducing a stream of preheated rich reactant gas at a non-peripheral point at one end of an unobstructed reaction chamber having an inlet end wall and generally cylindrical side wall and an open outlet end, the cross sectional area of the open outlet end being substantially the same as the cross sectional area of the cylindrical reaction chamber, the rich reactant gas being introduced in a direction parallel to the longitudinal axis of the cylindrical chamber; forming a layer of flame and combustion products in contact with the whole inner surface of the cylindrical walls of the reaction chamber by introducing a mixture of the above said fuel gas and at least sufficient air for substantially complete combustion of the said fuel gas, introducing the fuel gas and air mixture into the reaction chamber at a point on the circumference of the reaction chamber in a direction essentially tangent to the circumference and normal to the longitudinal axis thereof, burning the combustible mixture to maintain the temperature in the reaction chamber at the carbon black forming temperature, cooling the effluents of the reaction chamber to below the carbon cracking temperature and separating the carbon black from the products of combustion.

2. The process of making carbon black of increased yield from hydrocarbon gas mixtures comprising the steps of separating the hydrocarbon gas mixture into a fraction relatively rich in carbon termed rich reactant gas, and a fraction relatively lean in carbon termed fuel gas; continuously mixing a stream of preheated rich reactant gas and a stream of preheated reactant air, the amount of air being insufficient for complete combustion of the preheated rich reactant gas; and continuously introducing this reactant mixture at a non-peripheral point of the inlet end wall of an unobstructed reaction chamber having an inlet end wall and generally cylindrical side wall and an open outlet end, the cross sectional area of the open outlet end being substantially the same as the cross sectional area of the cylindrical reaction chamber, the rich reactant gas being introduced in a direction parallel to the longiudinal axis of the cylindrical chamber; forming a layer of flame and combustion products in contact with the whole inner surface of the cylindrical walls of the reaction chamber by introducing a mixture of the above said fuel gas and at least sufficient air for substantially complete combustion of the said fuel gas, introducing the fuel gas and air mixture into the reaction chamber at a point on the circumference of the reaction chamber in a direction essentially tangent to the circumference and normal to the longitudinal axis thereof, burning the combustible mixture to maintain the temperature in the reaction chamber at the carbon black forming temperature, cooling the effluents of the reaction chamber to below the carbon cracking temperature and separating the carbon black from the products of combustion.

3. The process of making carbon black of increased yield from hydrocarbon gas mixtures comprising the steps of separating the hydrocarbon gas mixture into a fraction relatively rich in carbon termed rich reactant gas, and a fraction relatively lean in carbon termed fuel gas; introducing a stream of preheated rich reactant gas at a non-peripheral point of the inlet end wall of an unobstructed reaction chamber having an inlet end wall and generally cylindrical side wall and an open outlet end, the cross sectional area of the open outlet end being substantially the same as the cross sectional area of the cylindrical reaction chamber, the rich reactant gas being introduced in a direction parallel to the longitudinal axis of the cylindrical chamber; forming a layer of flame and combustion products in contact with the whole inner surface of the cylindrical walls of the reaction chamber by introducing a mixture of the above said fuel gas and at least sufficient air for substantially complete combustion of the said fuel gas, introducing the fuel gas and air mixture into the reaction chamber at a point on the circumference of the reaction chamber in a direction essentially tangent to the circumference but pointing a few degrees off normal to the longitudinal axis thereof and in a downstream direction, burning the combustible mixture to maintain the temperature in the reaction chamber at the carbon black forming temperature, cooling the effluents of the reaction chamber to below the carbon cracking temperature and separating the carbon black from the products of combustion.

JOSEPH C. KREJCI.